UNITED STATES PATENT OFFICE.

CHRISTOPHER CORY, OF LIMA, INDIANA.

IMPROVED MODE OF CLARIFYING AND CONDENSING THE JUICES OF FRUITS.

Specification forming part of Letters Patent No. 42,841, dated May 24, 1864.

*To all whom it may concern:*

Be it known that I, CHRISTOPHER CORY, of Lima, in the county of La Grange and State of Indiana, have invented a new and useful process of manufacturing the juices of apples, pears, peaches, currants, grapes, melons, and other articles having similar or requisite juices, into sirups and jellies for domestic and foreign uses; and I do declare that the following is a full and exact description thereof.

The nature of my invention consists in producing jellies and sirups for domestic and foreign uses from the juices of apples, pears, peaches, currants, grapes, and melons, and other articles having similar or requisite juices, by submitting the said juices in thin sheets or shallow currents to the heated surface of evaporating-pans till the requisite purity and density are secured.

To enable others skilled in the art to use my invention, I present the following statements:

This process of manufacture may be carried forward on diversely-constructed evaporating-pans—such as are now used in the sorgo enterprise—to comparative advantage, though decided preference is given to those of an oblong shape with the zigzag channel, and having the elevated partition and gate for clarifying and regulating purposes, the same having proved itself, from its peculiar construction and principle of operation, every way adapted to the work.

For all ordinary purposes the cider and other liquids should be taken fresh from the press and kept as free from fermentation as may be, and in case of delays or the existence of active causes of fermentation, the moderate use of suitable harmless agents should be applied to prevent said fermentation. The liquid should be strained. It is then submitted, in a thin body or shallow current, (in case of a channeled evaporator,) to the heated surface of the evaporating apparatus, which, for greater dispatch and perfection, should be kept in a high state of heat by well-regulated fires underneath, or their equivalent, till the requisite purity and density are reached.

Preference is given to copper for the bottom of the pan, as furnishing better heat and being less injurious to the liquid. It should also be kept bright and free from corrosion when used for this purpose.

By working with comparatively small quantities at a time or shallow currents the impurities are more readily and fully thrown to the surface of the liquid, and evaporation is also proportionably faster, while the quality of the article, other things being equal, is far more eligible.

Entire cleansing, rapid condensation without remixing the raw material with the finishing portions thereof, are desirable points to be aimed after in the skillful manufacture of these sirups and jellies. On the channeled evaporator with the nearly-continuous flow of the liquid the whole work of clarifying and concentrating to a jelly may be completed in the narrow space of twenty to thirty minutes, and at the speed of eight hundred to one thousand pounds of jelly in ten working hours on a medium-sized pan suitable for family or neighborhood use.

The jellies thus manufactured may vary in appearance and quality much in accordance with the different articles from which they are made. They are usually of a light transparent color and of a pleasant taste. Hitherto they have been much admired wherever introduced.

In presenting the above application for Letters Patent I make no claim to boiling cider or other juices generally or in vacuum; but I do claim—

The manufacturing of cider and other similar fluids into sirups and jellies for domestic and foreign uses, substantially in the manner specified.

CHRISTOPHER CORY.

Witnesses:
JOS. W. CUMMINGS,
EDM. F. BROWN.